United States Patent [19]
Grilli et al.

[11] Patent Number: 6,091,198
[45] Date of Patent: *Jul. 18, 2000

[54] DEMAGNETIZATION CIRCUIT FOR CATHODE-RAY TUBE VIDEO DEVICE

[75] Inventors: Fabio Grilli, Monza; Giuseppe Cestari, Milan; Alessandro Messi, Monza, all of Italy

[73] Assignee: STMicroelectronics S.r.l., Agrate Brianza, Italy

[*] Notice: This patent issued on a continued prosecution application filed under 37 CFR 1.53(d), and is subject to the twenty year patent term provisions of 35 U.S.C. 154(a)(2).

[21] Appl. No.: 09/141,083

[22] Filed: Aug. 27, 1998

[30] Foreign Application Priority Data

Aug. 29, 1997 [IT] Italy ................... MI97A1985

[51] Int. Cl.[7] ..................................................... H04N 9/29
[52] U.S. Cl. ............................................. 315/8; 361/150
[58] Field of Search .............................. 315/8; 361/150

[56] References Cited

U.S. PATENT DOCUMENTS

| | | | |
|---|---|---|---|
| 4,441,052 | 4/1984 | Willis | 315/8 |
| 4,489,253 | 12/1984 | Godawski | 315/8 |
| 4,769,577 | 9/1988 | Morrish | 315/8 |
| 5,168,195 | 12/1992 | Breidigan et al. | 315/8 |

FOREIGN PATENT DOCUMENTS 59-92690  5/1984  Japan ...................... 361/150

*Primary Examiner*—Justin P. Bettendorf
*Attorney, Agent, or Firm*—Theodore E. Galanthay; Allen, Dyer, Doppelt, Milbrath & Gilchrist, P.A.

[57] ABSTRACT

A cathode-ray tube video device connected to a power source and having a first normal operating state and at least a second operating state at reduced power (stand-by mode) includes a switching power supply and a circuit portion for demagnetizing the cathode-ray tube coupled to the power source through an electrically actuated switch. The switch is closed to demagnetize the cathode-ray tube during the first operating state of the device, and opened during the second operating state at reduced power of the device.

2 Claims, 1 Drawing Sheet

DEMAGNETIZATION CIRCUIT FOR CATHODE-RAY TUBE VIDEO DEVICE

FIELD OF THE INVENTION

The present invention relates to a video device including circuitry for the demagnetization of a cathode-ray tube. More specifically, this invention relates to a cathode-ray tube video device connected to a power supply having a first normal operating state, and a second operating state at reduced power (stand-by mode).

BACKGROUND OF THE INVENTION

A conventional type of color video device with a cathode-ray tube comprises a demagnetization coil with associated circuitry which permits the demagnetization of the cathode-ray tube. The demagnetization coil is fixed to the cathode-ray tube and is fed by AC power as the video device is switched on through a thermistor (PTC) with a positive temperature coefficient. The current passing through the coil heats the thermistor, increasing the resistance thereof, thus exponentially limiting the current itself. Additional resistances, thermally coupled to the thermistor, are needed to maintain the thermistor at a desired temperature during the normal operation of the video device.

Unfortunately, such a demagnetization circuit has some disadvantages. One of the main disadvantages, due to the existing environmental requirements relating to energy savings, resides in that both during the normal operation and during the operation at reduced power (stand-by) a non-negligible amount of power is dissipated in heat by the thermistor itself and by the resistances coupled thereto. At present, in fact, TV-sets are normally left in a stand-by state, a condition where the main loads, such as the audio amplifier and the vertical and horizontal deflection circuits, are not connected. However, the power supply is still connected to the AC power and keeps supplying a non-negligible amount of power.

The main reasons for the above mentioned power consumption in the stand-by state may be listed as follows:
  power consumed by the power supply to supply energy to the microchip and to the infrared receiver connected thereto, which must guarantee the switch-on of the TV-set, such power being about 5 Watts, and makes use of a switching power supply (Switched Mode Power Supply—SMPS) that foresees an operational stand-by state named "Burst-mode" at reduced consumption rate; and
  power consumed by the thermistor (PTC) connected in series with the demagnetization coil and by the resistances coupled thereto, averaging about 1.5 Watts.
This last item is a mere loss, as it is not needed for keeping the stand-by condition itself.

The demagnetization function provided by the PTC thermistor is exclusively active at the first switch-on of the TV-set and ends when the thermistor has heated up and its internal resistance has reached the maximum value. Accordingly, at any successive switch-on from the stand-by state, the cathode-ray tube is no longer being demagnetized as the thermistor is already warm, and, therefore, at its maximum value of internal resistance.

Unfortunately, this may represent a serious problem if the TV-set is left in the stand-by state for a long time or if a sudden change in the magnetic field takes place inside or outside the TV-set itself (due to the movement or approaching of magnetic material). By changing from the stand-by state to the switched-on state, the TV tube will show colored spots that modify the regular chromaticity of the image visualized. Only after the complete switch-off of the TV-set and a successive switch-on again, will the TV-tube again be efficient, having been demagnetized.

SUMMARY OF THE INVENTION

In view of the foregoing background, it is therefore an object of the present invention to provide a cathode-ray tube video device with a circuit for the demagnetization of the cathode-ray tube which overcomes the above indicated limits of the prior art.

The object of the invention is realized in a cathode-ray tube video device connected to a power source, having a first normal operating state and a second operating state at reduced power (stand-by mode) and comprising means for demagnetizing the cathode-ray tube coupled to the power supply through an electrically actuated switch. The switch is closed to demagnetize the cathode-ray tube during the first operating state of the device and opened during the second operating state of the device at reduced power (stand-by mode).

BRIEF DESCRIPTION OF THE DRAWINGS

The features and advantages of the present invention will be more evident from the following description of an example embodiment, shown by way of a non-limiting example in the accompanying drawings.

DETAILED DESCRIPTION OF THE PREFERRED EMBODIMENTS

As a non-limiting example it will be assumed that the video device is a TV set. Analogously the same circuit may be applied to other devices, such as, for example, computer monitors, having an operational mode at reduced power.

TV sets normally have two operational modes, the switched-on one and the stand-by one, whereby the power consumed by the power supply is considerably different. During the normal operation, the power supply must supply power to all the TV set circuits, whereas in the stand-by mode only some circuits need to be fed with power.

Power supplies as well, in particular the switching ones (SMPS) have therefore two operational modes, one at full power corresponding to the switched-on state of the TV set, and one at reduced power corresponding to the stand-by state. During normal operation the power supply operates in a continuous manner, whereas during the stand-by phase it operates in a so-called pulse train state or "burst mode", i.e. the envelope of the collector current of the power transistor used for the commutation generates a pulse train of a certain duration, for example, 7 msec, and a rest or stop period, for example, of 14 msec.

Figure 1:
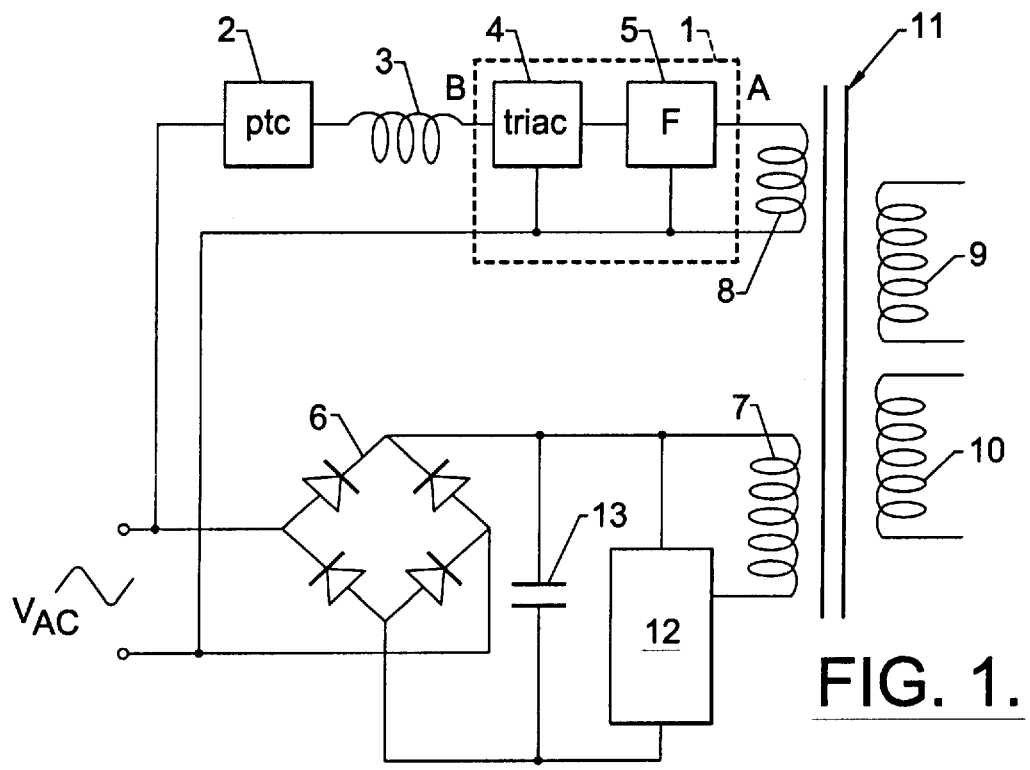
FIG. 1 shows, by means of a block diagram, a supply circuit of the video device, comprising a demagnetization circuit realised according to the present invention.

In FIG. 1 there is shown a block diagram of a switching power supply (SMPS) for a cathode-ray tube video device, for example a TV-set, to which there is coupled a demagnetization circuit of the cathode-ray tube, the ensemble being realized according to the present invention. The circuit comprises a diode rectifier bridge 6, to which an AC power at voltage $V_{AC}$ is applied, which provides a rectified voltage to a filter condenser 13 and to an integrated circuit 12 dedicated to the management of the power supply.

The integrated circuit 12 controls the current in a primary winding 7 of a transformer 11 so as to maintain constant the voltages on the secondary windings 9, 10 in the various load conditions. An input terminal of the circuit 12, not shown in FIG. 1, is coupled to one of the secondary windings of the transformer and permits, by closing a feedback loop, maintaining constant the output voltages of the power supply.

An auxiliary winding 8 of the transformer 11, used as a secondary winding and coupled to a filter circuit 5, permits interrupting, through a solid state switch or TRIAC 4, the flow of the current in a demagnetization coil 3 of a cathode-ray tube not shown in the drawing. The demagnetization coil 3 is connected to the AC power voltage $V_{AC}$ through a thermistor 2 with a positive temperature coefficient.

Figure 2:
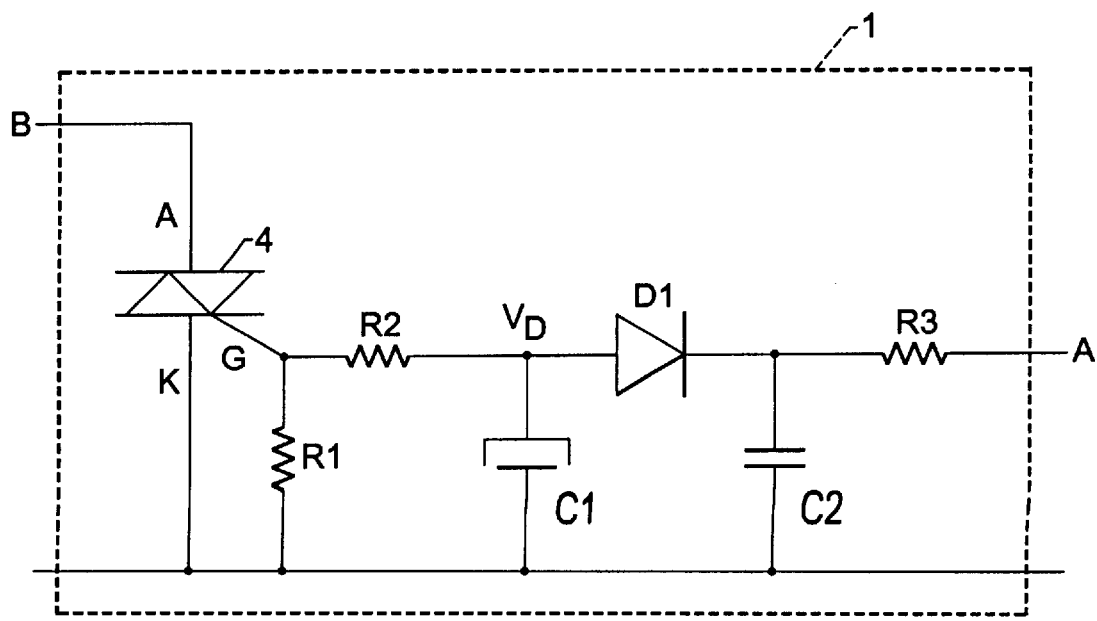
FIG. 2 shows in detail part of the circuit of FIG. 1.

The integrated circuit 12 controls the two operational modes of the power supply, a normal one corresponding to the normal operation of the TV set, and a second one at reduced power, corresponding to the stand-by state. In FIG. 2 there is shown in detail the block 1 of the FIG. 1 comprising a filter circuit and the solid state switch or TRIAC 4.

At an input terminal A of the filter there is applied an alternating voltage $V_A$ derived from the auxiliary winding 8 of the transformer 11. The voltage $V_A$ is first filtered by a lowpass filter R3-C2, then rectified by a diode D1 and smoothed by an electrolytic capacitor C1. Such rectified voltage $V_D$ is then applied, through a resistive divider R1–R2, to gate terminal G of TRIAC 4 used to interrupt the flow of the current in the demagnetization coil 3. The conduction path A-K of the TRIAC 4 is in fact connected in series with coil 3 and to the thermistor 2.

The operation of the circuit shown in FIGS. 1 and 2 is now described. When the TV set is in standby state, the power supply operates in "burst-mode" and the level of the rectified voltage $V_D$ is not enough to switch the TRIAC that it remains open and the PTC thermistor 2 is not fed with the AC power voltage. Accordingly, in this state, there is no current consumption by the thermistor and by the resistances coupled thereto. When the TV set is switched on from the stand-by state, the power supply changes its operation from "burst-mode" to a continuous mode. The level of the rectified voltage $V_D$ increases making it possible to reach the ignition voltage of the TRIAC 4 and to connect the PTC thermistor 2 to the AC Power voltage, thus providing for the demagnetization of the cathode-ray tube.

The PTC thermistor 2 heats up increasing its resistance and allowing the passage of a small residual current. This residual current causes a power dissipation equal to about 1.5 Watt that, if compared to the total TV set energy consumption in the switched on state, is negligible.

When the TV set is put again into a "stand-by" state, TRIAC 4 exits the conduction state thereby again disconnecting the PTC thermistor 2 from the AC power voltage, thus eliminating the 1.5 Watt power absorption dissipated by the thermistor. Such an amount of dissipated power in the stand-by state, is in fact not at all negligible. In this way it is possible to reduce the current consumption by the TV set in the stand-by state, while at the same time ensuring the demagnetization of the cathode-ray tube at every switch-on of the TV set itself, also when switching it on from the stand-by state.

That which is claimed is:

1. A cathode-ray tube video device for being connected to a power source and having a first normal operating state and at least a second reduced power operating state, the device comprising:

a switching power supply having a first continuous operating state corresponding to the normal operating state of the device and at least one second operating state having a pulse train corresponding to the second reduced power operating state of the device wherein said switching power supply comprises:

a filter circuit;

a transformer having a primary winding;

a plurality of secondary windings;

an auxiliary winding which controls said electrically actuated switch through said filter circuit;

a demagnetizing coil for demagnetizing the cathode-ray tube;

an electrically actuated switch for coupling said demagnetizing means to the power source, said switch being closed to demagnetize the cathode-ray tube during the first normal operating state and being opened during the second reduced power operating state, wherein said electrically actuated switch comprises a TRIAC, a terminal connected to said demagnetizing coil and a control terminal connected to said filter circuit, and having a control terminal receiving an electrical signal from said filter circuit to change the TRIAC into conduction during the first normal operating state;

a thermistor having a positive temperature coefficient and one end connected to a source of power and the other end connected to said demagnetizing coil;

a diode rectifier bridge;

an integrated circuit connected to said diode rectifier bridge for controlling current in the primary winding of the transformer to maintain constant voltages of the plurality of secondary windings;

wherein said filter circuit comprises a low pass filter for filtering the voltage applied by the auxiliary winding, a rectifying diode and at least one capacitor connected to said low pass filter for rectifying and smoothing the signal received from the low pass filter, and a resistive divider circuit connected to said rectifying diode and capacitor and the TRIAC and configured for allowing "burst-mode" and continuous mode operation.

2. A video device for being connected to a power source and having a normal operating state and a reduced power operating state, the video device comprising:

a cathode-ray tube;

a switching power supply having a first continuous operating state corresponding to the normal operating state and a second operating state corresponding to the reduced power operating state, wherein said switching power supply comprises:

a filter circuit;

a transformer having a primary winding;

a plurality of secondary windings;

an auxiliary winding which controls said switch through said filter circuit;

a thermistor having a positive temperature coefficient and one end connected to a source of power;

a demagnetizing coil connected in series with said thermistor to the other end of the thermistor for demagnetizing said cathode-ray tube; and a switch connected in series with said thermistor and said demagnetizing coil for coupling said demagnetizing coil to the power source during the normal operating state, and for decoupling said demagnetizing coil from the power source during the reduced power operating state, wherein said switch comprises a TRIAC, a terminal connected to said demagnetizing coil and a control terminal connected to said filter circuit, and having a control terminal receiving a signal from said filter circuit to change the TRIAC into conduction during the normal operating state;

a thermistor having a positive temperature coefficient and one end connected to a source of power and the other end connected to said demagnetizing coil;

a diode rectifier bridge:

an integrated circuit connected to said diode rectifier bridge for controlling current in the primary winding of the transformer to maintain constant voltages of the plurality of secondary windings;

wherein said filter circuit comprises a low pass filter for filtering the voltage applied by the auxiliary winding, a rectifying diode and at least one capacitor connected to said low pass filter for rectifying and smoothing the signal received from the low pass filter, and a resistive divider circuit connected to said rectifying diode and capacitor and the TRIAC and configured for allowing "burst-mode" and continuous mode operation.

* * * * *